(12) United States Patent
Christoffers et al.

(10) Patent No.: US 8,006,801 B2
(45) Date of Patent: Aug. 30, 2011

(54) NOISE DAMPER FOR A COMPRESSED AIR DEVICE

(75) Inventors: Bernd Christoffers, Wenningsen (DE);
Dieter Steinfeld, Hannover (DE);
Hendrick Harting, Hameln (DE)

(73) Assignee: WABCO GmbH, Hannover (DE)

( * ) Notice: Subject to any disclaimer, the term of this patent is extended or adjusted under 35 U.S.C. 154(b) by 485 days.

(21) Appl. No.: 11/658,335

(22) PCT Filed: Jun. 4, 2005

(86) PCT No.: PCT/EP2005/006029
§ 371 (c)(1),
(2), (4) Date: Jan. 23, 2007

(87) PCT Pub. No.: WO2006/010400
PCT Pub. Date: Feb. 2, 2006

(65) Prior Publication Data
US 2008/0289900 A1    Nov. 27, 2008

(30) Foreign Application Priority Data

Jul. 24, 2004 (DE) .................. 20 2004 011 630 U

(51) Int. Cl.
*F01N 1/04* (2006.01)
(52) U.S. Cl. ......... 181/230; 181/239; 181/252; 181/256
(58) Field of Classification Search .................. 181/230, 181/238, 258, 229, 239, 252, 256, 282, 403; 173/DIG. 2
See application file for complete search history.

(56) References Cited

U.S. PATENT DOCUMENTS

| | | | |
|---|---|---|---|
| 1,951,813 A | 3/1934 | Watson | |
| 2,815,088 A * | 12/1957 | Gibel | 181/230 |
| 2,990,907 A * | 7/1961 | Everett | 181/256 |
| 3,009,531 A * | 11/1961 | Mead | 181/239 |
| 3,243,011 A | 3/1966 | Hill | |
| 3,374,855 A * | 3/1968 | Kelly et al. | 181/235 |
| 3,380,553 A * | 4/1968 | Gibel | 181/230 |
| 3,400,784 A | 9/1968 | Thrasher | |
| 3,561,561 A * | 2/1971 | Trainor | 181/267 |
| 3,923,120 A * | 12/1975 | Jatcko | 181/239 |
| 3,949,828 A * | 4/1976 | Frochaux | 181/230 |
| 3,957,133 A * | 5/1976 | Johnson | 181/256 |
| 4,219,100 A * | 8/1980 | Wyse | 181/230 |
| 4,241,805 A * | 12/1980 | Chance, Jr. | 181/232 |
| 4,316,523 A * | 2/1982 | Boretti | 181/226 |
| 4,324,314 A * | 4/1982 | Beach et al. | 181/230 |
| 4,685,533 A * | 8/1987 | Piesik | 181/213 |
| 4,877,084 A * | 10/1989 | Goggin | 166/75.11 |
| 4,971,612 A * | 11/1990 | Loughran | 96/387 |

(Continued)

FOREIGN PATENT DOCUMENTS

DE    28 15 464 C2    10/1979

(Continued)

*Primary Examiner* — Jeremy Luks
(74) *Attorney, Agent, or Firm* — Kramer Levin Naftalis & Frankel LLP

(57) ABSTRACT

A noise damper for a compressed air device includes a tubular housing part provided with an air inlet and an inserted insulating material, in particular, an inserted knitted fabric roll. The air inlet is embodied in the envelope of the tubular housing part such that the supplied air tangentially flows through the insulating material or the knitted fabric roll, is radially deviated inside the tubular housing part, and axially flows out from at least one end of the tubular housing part.

32 Claims, 5 Drawing Sheets

U.S. PATENT DOCUMENTS

| | | | |
|---|---|---|---|
| 5,166,479 A * | 11/1992 | Gras et al. | 181/256 |
| 5,277,976 A | 1/1994 | Hogle et al. | |
| 5,452,919 A | 9/1995 | Hoyle et al. | |
| 5,467,595 A | 11/1995 | Smith | |
| 5,600,953 A | 2/1997 | Oshita et al. | |
| 5,711,150 A | 1/1998 | Oshita et al. | |
| 5,824,972 A | 10/1998 | Butler | |
| 6,006,520 A | 12/1999 | Zehnder, II et al. | |
| 6,089,346 A * | 7/2000 | Tredinnick et al. | 181/230 |
| 6,109,387 A * | 8/2000 | Boretti | 181/230 |
| 6,202,785 B1 * | 3/2001 | Hilling et al. | 181/230 |
| 6,520,286 B1 | 2/2003 | Frederiksen et al. | |
| 2004/0023014 A1 | 2/2004 | Williamson et al. | |
| 2004/0126247 A1 | 7/2004 | Broser et al. | |
| 2004/0127129 A1 | 7/2004 | Luo et al. | |

FOREIGN PATENT DOCUMENTS

| | | |
|---|---|---|
| DE | 235 680 A1 | 5/1986 |
| DE | 42 37 630 A1 | 5/1994 |
| DE | 101 21 582 A1 | 11/2002 |
| DE | 102 48 183 A1 | 4/2004 |
| EP | 0 132 696 A | 2/1985 |
| EP | 0 443 431 A2 | 8/1991 |
| EP | 0 600 331 B1 | 6/1994 |
| EP | 0 607 174 B1 | 6/1997 |
| EP | 1 211 338 B1 | 6/2002 |
| EP | 1 233 183 A1 | 8/2002 |
| EP | 1348844 A2 * | 10/2003 |
| JP | 0 129 8210 A | 12/1989 |
| JP | 0 527 9911 A | 10/1993 |
| JP | 2001105353 A * | 4/2001 |
| WO | WO 02/00973 A1 | 1/2002 |

* cited by examiner

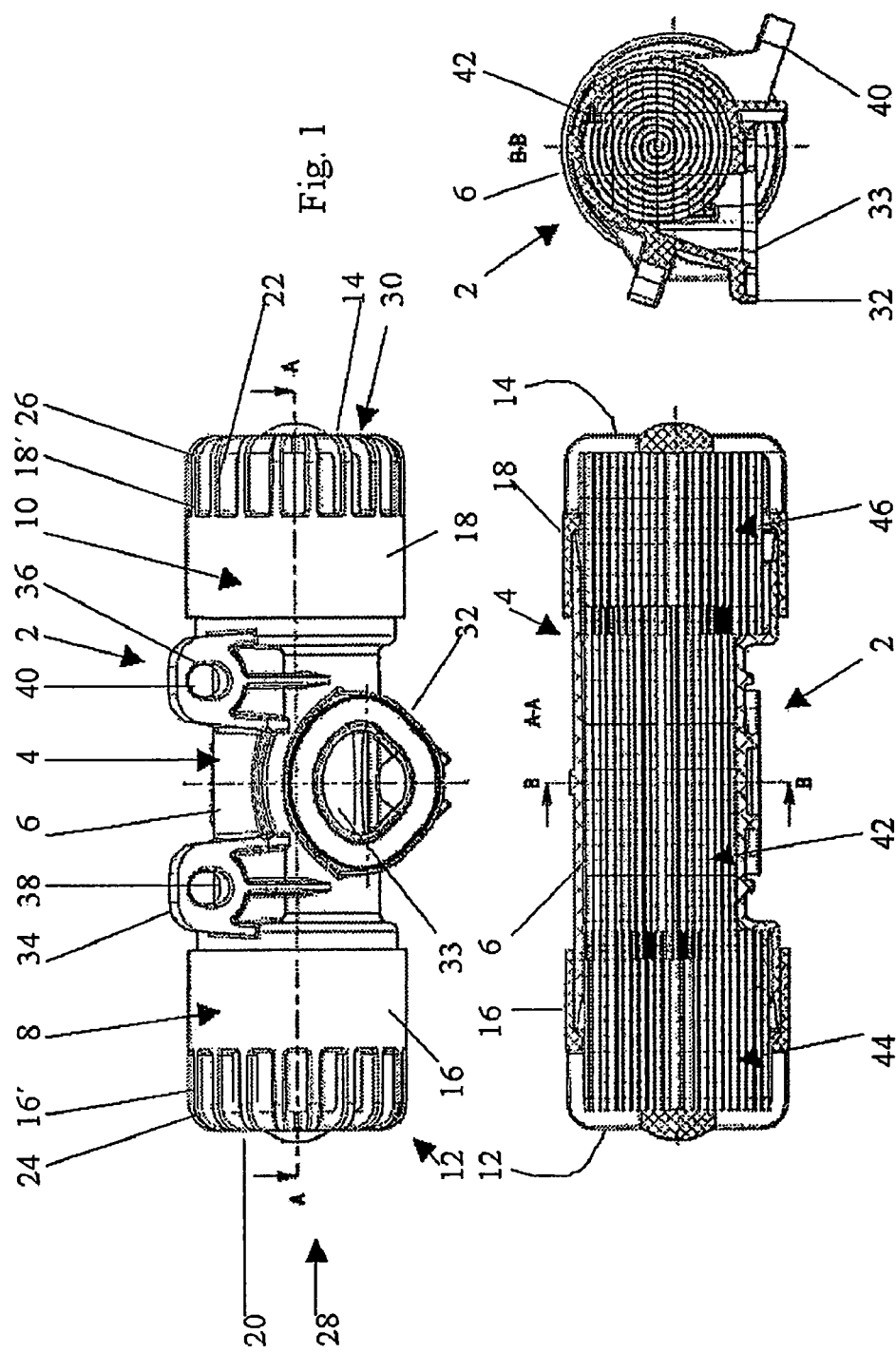

NOISE DAMPER FOR A COMPRESSED AIR DEVICE

BACKGROUND OF THE INVENTION

The present invention relates to an improved noise damper for compressed air devices.

From DE 102 48 183 A1 it is known that insulating materials can be used in the form of a knitted fabric roll in noise dampers of compressed air devices. Such a knitted fabric roll is made from a tubular knitted fabric produced on a circular knitting machine from warp knit thermoplastic fibres having, for example, rectangular cross section, by cutting a knitted fabric tube to a predetermined length and heat sealing it at its cut faces in such a way that a rectangular tubular portion is obtained. This rectangular tubular portion is then rolled up to obtain a knitted fabric roll. The knitted fabric roll is then pushed into a connecting tube leading to the atmosphere. Aside from the fact that it is necessary to use an additional connecting tube, which requires a large amount of installation space, and that it is necessary to take additional measures to ensure that the knitted fabric roll is held sufficiently in place in the connecting tube, the resulting noise damping is not satisfactory.

DE 42 37 630 A1 describes a compressed air venting device that has a primary air path routed from an inlet of a housing via noise damping means to an outlet, and a secondary air path provided parallel thereto and comprising a first sub-channel extending from the inlet and a second sub-channel formed by the outlet or leading to the outlet. The two sub-channels are not filled with the noise damping means. The two sub-channels are in communication with one another via the noise damping means. The two sub-channels and that part of the noise damping means which places the two sub-channels in communication are arranged in such a way that such part of the noise damping means opens up a direct communication path between the two sub-channels when a dynamic pressure is admitted. The noise damping means are formed by a filtering knitted fabric, which comprises a stocking-like woven part of plastic flat wire, which is wound in the form of a roll. The housing is composed of one housing part resembling a pot and another housing part formed as a cover to be snapped thereon. A disadvantage of this compressed air venting device used as a noise damper is that the danger of leaks causing a loud noise level exists at the joints of the housing parts. Moreover, the known device is relatively bulky, and therefore requires considerable installation space.

SUMMARY OF THE INVENTION

Generally speaking, in accordance with the present invention, an improved noise damper for compressed air devices, especially for vehicle air-brake systems, is provided which overcomes disadvantages associated with conventional noise dampers. The inventive noise damper achieves superior noise damping while simultaneously permitting high venting gradients, which can be installed in the vehicle even under very confined space conditions and which can be manufactured simply.

The noise damper according to embodiments of the present invention includes a tubular housing part provided with an air inlet and an inserted insulating material, in particular, an inserted knitted fabric roll. The air inlet is embodied in the envelope of the tubular housing part such that the supplied air tangentially flows through the insulating material or the knitted fabric roll, afterwards, is radially deviated inside the tubular housing part and axially flows out from at least one end of the tubular housing part.

Still other objects and advantages of the present invention will in part be obvious and will in part be apparent from the specification.

The present invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

The present invention will be described in more detail hereinafter on the basis of the accompanying drawings, wherein:

FIG. 1 is a perspective side view of a noise damper in accordance with a preferred embodiment of the present invention with a view of an air-inlet nozzle;

FIG. 2 is a sectional view taken along line A-A of the embodiment of the noise damper depicted in FIG. 1;

FIG. 3 is a sectional view taken along line B-B of the embodiment of the noise damper depicted in FIG. 2;

DETAILED DESCRIPTION OF THE PREFERRED EMBODIMENTS

Figure 4:
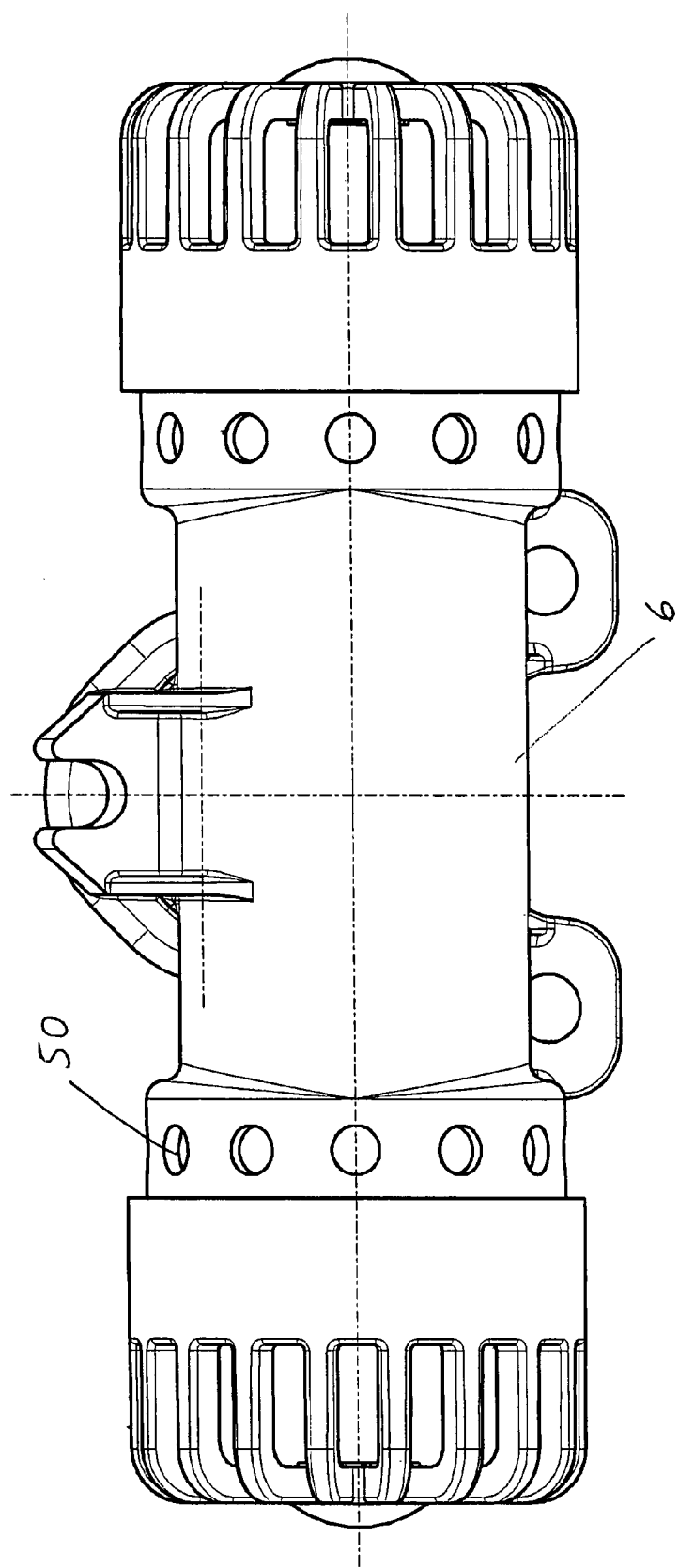
FIG. 4 depicts a noise damper in accordance with an alternative embodiment of the present invention.

Referring now to the drawings, where like and corresponding components are represented with like reference numerals, FIG. 1 shows a noise damper 2 according to a preferred embodiment of the present invention with a housing 4, including a central tubular part 6 and two cylindrical housing caps 8, 10, which are mounted, preferably by snap fit, on the ends of tubular housing part 6 and can also be removed therefrom.

Housing caps 8, 10 are provided with cap bases 12, 14 and cylindrical jackets 16, 18, respectively. Radial slots 20, 22 are formed in cap bases 12, 14, respectively. Slots 20, 22 extend over respective transition regions 24, 26 into parts 16', 18' of jackets 16, 18 adjacent to the cap bases and form outlets 28, 30 of noise damper 2.

Tubular part 6 of housing 4 is provided with a molded-on, centrally disposed inlet nozzle 32 with inlet opening 33 for compressed air and two flanges 34, 36 with mounting holes 38, 40, with which noise damper 2 can be disposed on the housing of a vent valve (not shown), for example, such that inlet nozzle 32 can be connected practically directly to the valve outlet.

As shown in FIGS. 2 and 3, in tubular housing part 6 and both housing caps 8, 10 there are inserted noise damping means, preferably, knitted fabric rolls 42, 44, 46.

Inlet nozzle 32 is constructed and arranged such that the air to be discharged to the atmosphere flows in at the middle of the tubular housing part, substantially tangentially relative to knitted fabric roll 42, then is deflected radially toward both sides, flows axially through knitted fabric roll 42 of housing part 6 and the two knitted fabric rolls 44, 46 of housing caps 8, 10, and, finally, flows out of outlets 28, 30. By virtue of the two air streams emerging in opposite directions into the atmosphere, this construction of the noise damper acts as an acoustic dipole radiator.

Alternatively, tubular housing part 6 can be equipped with only one housing cap and can be constructed in closed form on one side, so that the air flowing into noise damper 2 is deflected radially to only one side and flows out axially from only one outlet. Such a noise damper acts as an acoustic monopole.

By means of the noise damper according to embodiments of the present invention, the turbulent flow in the free air jet is influenced to the effect that sound emission during a venting operation is reduced, or noise or sound damping is increased, while the necessary functions are provided in the existing installation space and, in particular, the specified venting times after braking operations are complied with.

The inventive noise damper can be manufactured simply from plastic, for example, in which case a housing cap can also be formed in one piece with the tubular housing part. One cap is preferably mounted detachably, so that replacement of the knitted fabric rolls is possible. The inventive noise damper is very compact, and so installation in the vehicle is possible even under very confined space conditions.

The foregoing advantages are also achieved by the modified embodiments of the inventive noise damper described below.

In one modified embodiment depicted in FIG. 4, in addition to outlets 28, of housing caps 8, 10, at least one further outlet opening 50 is disposed in tubular housing part 6.

Figure 5:
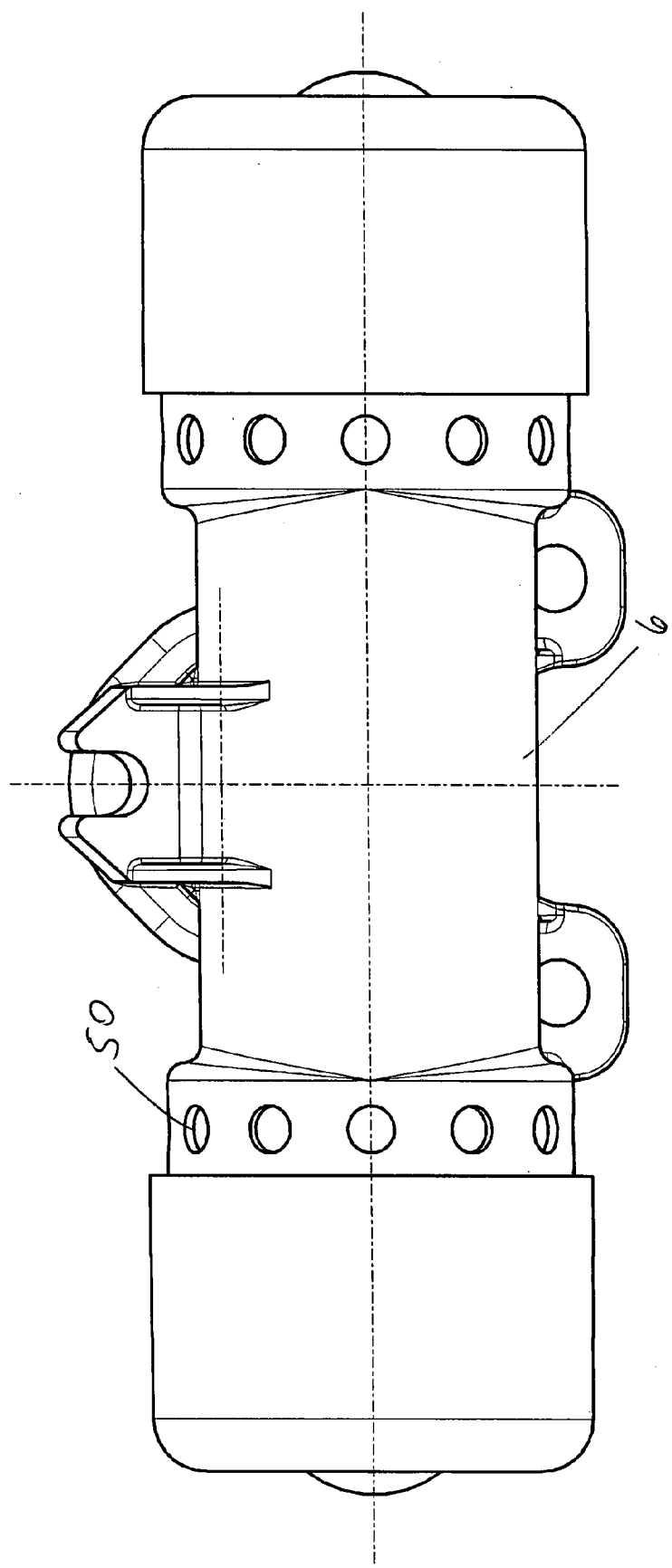
FIG. 5 depicts a noise damper in accordance with another alternative embodiment of the present invention.

In another embodiment depicted in FIG. 5, only at least one further outlet opening 50 is formed in tubular housing part 6, while housing caps 8, 10 do not have any outlets and are therefore closed.

Figure 6:
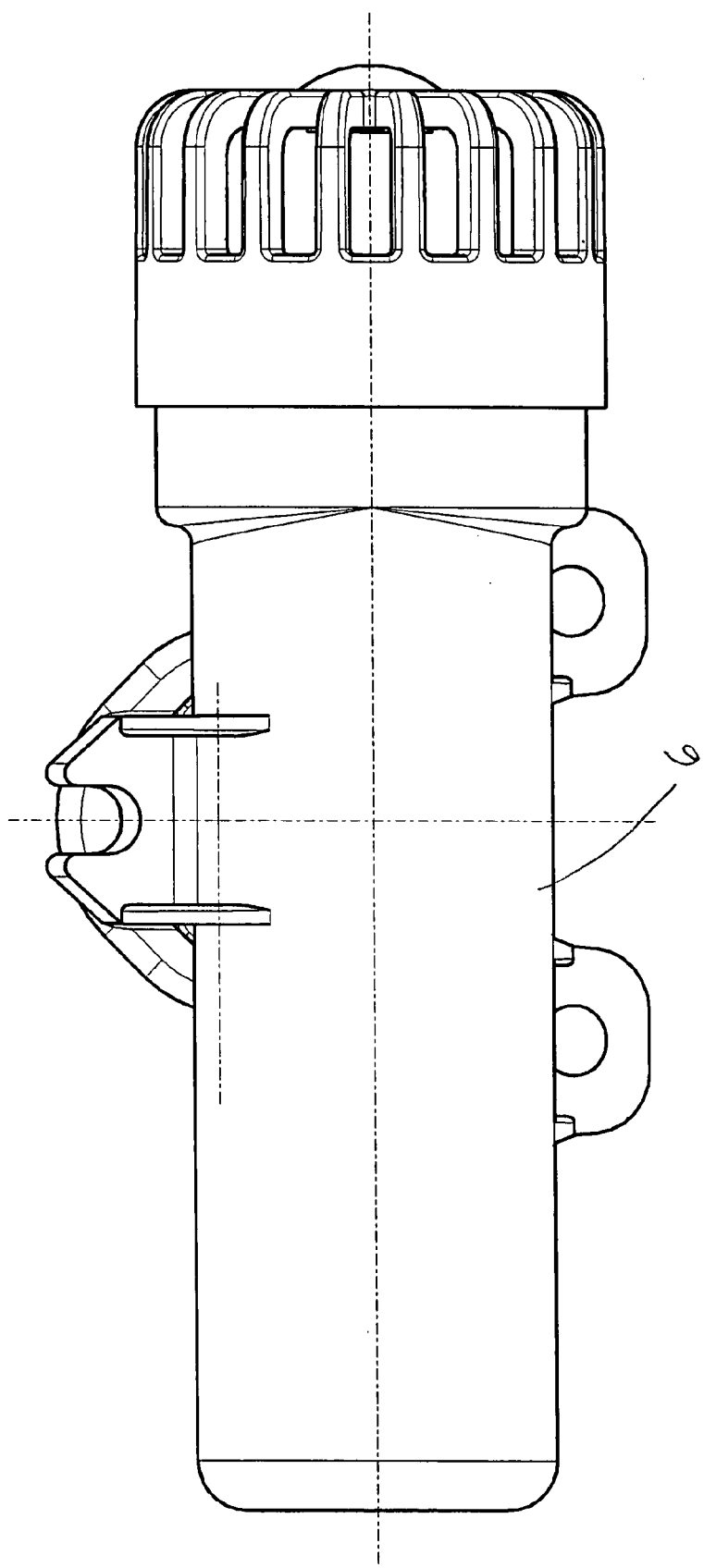
FIG. 6 depicts a noise damper in accordance with yet another alternative embodiment of the present invention.

According to a further embodiment depicted in FIG. 6, at least one of housing caps 8, 10 is dispensed with, preferably by providing a closed cap-free end on tubular housing 6.

Figure 7:
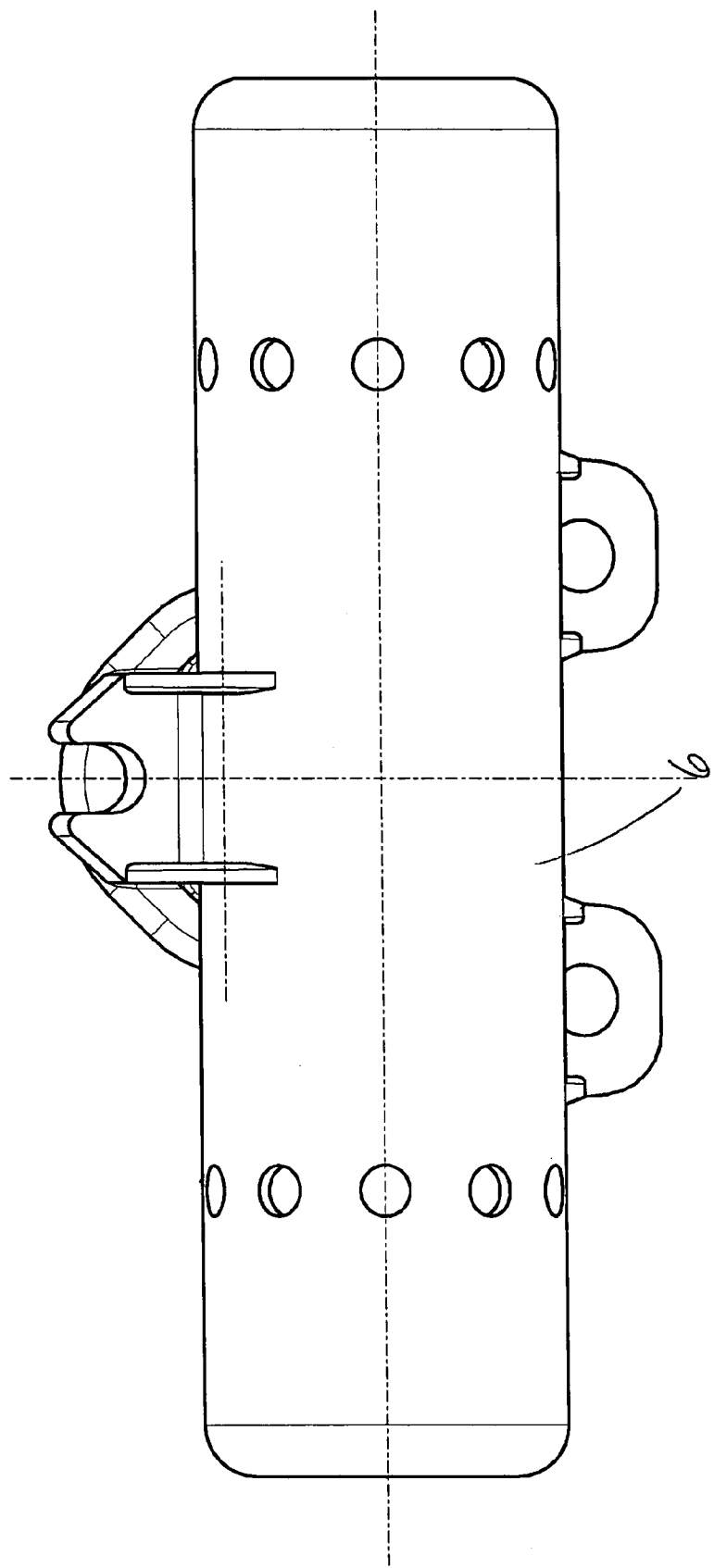
FIG. 7 depicts a noise damper in accordance with a further alternative embodiment of the present invention.

According to yet another embodiment depicted in FIG. 7, both housing caps 8, 10 are dispensed with or, if the caps are formed in one piece with the tubular housing part, closed ends or closed caps are formed at both ends of the tubular housing part. The knitted fabric roll can then no longer be replaced, but the noise damper produced in this form can be used as a disposable article, which can be justified by the low manufacturing costs for the housing.

Accordingly, the present invention provides, for compressed air devices, especially for vehicle air-brake systems, a noise damper which is extremely compact, is made of components that can be manufactured easily and substantially improves noise damping by means of novel air routing. Also, the inventive noise damper preserves the high venting gradient necessary for compressed air systems.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A noise damper for a compressed air device, comprising a tubular housing part having an air inlet, an air outlet, a jacket and sound damping material disposed therein, said air inlet being defined in said tubular housing part to direct a flow of incoming air through a portion of said sound damping material substantially tangential to said portion, and radially deflecting said air through said portion such that said air spirals axially there-through and out from at least one end of said tubular housing part.

2. The noise damper according to claim 1, further comprising at least one additional outlet opening defined in said jacket of said tubular housing part.

3. The noise damper according to claim 2, wherein said tubular housing part is closed at ends thereof.

4. The noise damper according to claim 1, further comprising a cylindrical housing cap mounted on at least one end of said tubular housing part.

5. The noise damper according to claim 1, further comprising housing caps mounted on opposing ends of said tubular housing part.

6. The noise damper according to claim 5, wherein said air outlet is defined in each of said housing caps.

7. The noise damper according to claim 5, wherein said sound damping material is insertable into said housing caps.

8. The noise damper according to claim 6, further comprising a cap base for each of said housing caps, each of said cap bases including radial slots defined therein to form said air outlet.

9. The noise damper according to claim 8, further comprising transition zones, wherein said radial slots extend beyond said transition zones as far as parts of said jacket adjacent to said cap bases.

10. The noise damper according to claim 5, wherein said housing caps each include a snap-fit connection for detachably mounting to said tubular housing part.

11. The noise damper according to claim 1, further comprising knitted fabric rolls and characterized in that said knitted fabric rolls are made of thermoplastic fibres, which are provided with a cross section having at least one of a profiled contour and a profiled surface in longitudinal direction of said fibres, in order to increase at least one of a surface area and specific surface of the fibres.

12. The noise damper according to claim 1, wherein said sound damping material is a knitted fabric roll.

13. The noise damper according to claim 4, wherein said air outlet is defined in said housing cap.

14. The noise damper according to claim 4, wherein said sound damping material is insertable into said housing cap.

15. The noise damper according to claim 4, further comprising a cap base for said housing cap, said cap base including radial slots defined therein to form said air outlet.

16. The noise damper according to claim 4, wherein said housing cap includes a snap-fit connection for detachably mounting to said tubular housing part.

17. The noise damper according to claim 1, further comprising at least one additional outlet opening defined in said jacket of said tubular housing part.

18. A noise damper for a compressed air device, comprising a tubular housing part having an air inlet, an air outlet, a jacket and sound damping material disposed therein, wherein said tubular housing part is closed at ends thereof, said air inlet being defined in said tubular housing part to direct a flow of incoming air substantially tangentially relative to said sound damping material, wherein said air is radially deflected inside said tubular housing part such that said air flows axially out from at least one end of said tubular housing part.

19. The noise damper according to claim 18, further comprising at least one additional outlet opening defined in said jacket of said tubular housing part.

20. The noise damper according to claim 18, further comprising a cylindrical housing cap mounted on at least one end of said tubular housing part.

21. The noise damper according to claim 18, further comprising housing caps mounted on opposing ends of said tubular housing part.

22. The noise damper according to claim 21, wherein said air outlet is defined in each of said housing caps.

23. The noise damper according to claim 22, wherein said sound damping material is insertable into said housing caps.

24. The noise damper according to claim 22, further comprising a cap base for each of said housing caps, each of said cap bases including radial slots defined therein to form said air outlet.

25. The noise damper according to claim 24, further comprising transition zones, wherein said radial slots extend beyond said transition zones as far as parts of said jacket adjacent to said cap bases.

26. The noise damper according to claim 21, wherein said housing caps each include a snap-fit connection for detachably mounting to said tubular housing part.

27. The noise damper according to claim 18, wherein said sound damping material are knitted fabric rolls and characterized in that said knitted fabric rolls are made of thermoplastic fibres, which are provided with a cross section having at least one of a profiled contour and a profiled surface in longitudinal direction of said fibres, in order to increase at least one of a surface area and specific surface of the fibres.

28. The noise damper according to claim 18, wherein said sound damping material is a knitted fabric roll.

29. The noise damper according to claim 20, wherein said air outlet is defined in said housing cap.

30. The noise damper according to claim 20, wherein said sound damping material is insertable into said housing cap.

31. The noise damper according to claim 20, further comprising a cap base for said housing cap, said cap base including radial slots defined therein to form said air outlet.

32. The noise damper according to claim 20, wherein said housing cap includes a snap-fit connection for detachably mounting to said tubular housing part.

* * * * *